US012763455B2

(12) United States Patent
Xiao et al.

(10) Patent No.: US 12,763,455 B2
(45) Date of Patent: Oct. 13, 2026

(54) ANTENNA SYSTEM AND BASE STATION ANTENNA FEEDER SYSTEM

(71) Applicant: HUAWEI TECHNOLOGIES CO., LTD., Shenzhen (CN)

(72) Inventors: Weihong Xiao, Dongguan (CN); Zhiqiang Liao, Shenzhen (CN); He Cui, Dongguan (CN); Jianping Li, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 84 days.

(21) Appl. No.: 18/621,837

(22) Filed: Mar. 29, 2024

(65) Prior Publication Data

US 2024/0283138 A1 Aug. 22, 2024

Related U.S. Application Data

(63) Continuation of application No. PCT/CN2022/121392, filed on Sep. 26, 2022.

(30) Foreign Application Priority Data

Sep. 30, 2021 (CN) .......................... 202111162182.9

(51) Int. Cl.

*H01Q 1/24* (2006.01)
*H01Q 1/42* (2006.01)

(Continued)

(52) U.S. Cl.

CPC ............... *H01Q 1/246* (2013.01); *H01Q 1/42* (2013.01); *H01Q 1/526* (2013.01); *H01Q 3/30* (2013.01);

(Continued)

(58) Field of Classification Search

CPC ...... H01Q 1/246; H01Q 1/42; H01Q 15/0013; H01Q 1/526; H01Q 3/30; H01Q 5/42; H01Q 21/26

See application file for complete search history.

(56) References Cited

U.S. PATENT DOCUMENTS 9,450,304 B1 9/2016 Edalati et al.
12,300,908 B2 * 5/2025 Li .......................... H01Q 1/246

(Continued)

FOREIGN PATENT DOCUMENTS

CN 111355016 A * 6/2020 ............. H01Q 1/526
JP 2014171100 A 9/2014

(Continued)

*Primary Examiner* — Dameon E Levi
*Assistant Examiner* — Yonchan J Kim

(57) ABSTRACT

An antenna system and a base station antenna feeder system are provided. The antenna system includes a first frequency band radiation element array, a frequency selective surface, a second frequency band radiation element, and a phase shifter. The frequency selective surface is configured to reflect a signal of the first frequency band radiation element array and to transmit a signal of the second frequency band radiation element array. The phase shifter is connected to the first frequency band radiation element array and is configured to feed the first frequency band radiation element array. The phase shifter includes a cavity which is disposed at an edge of the frequency selective surface, a first extension direction of the cavity being consistent with a second extension direction of the first frequency band radiation element array.

21 Claims, 15 Drawing Sheets

(51) Int. Cl.

| | |
|---|---|
| ***H01Q 1/52*** | (2006.01) |
| ***H01Q 3/30*** | (2006.01) |
| ***H01Q 5/42*** | (2015.01) |
| ***H01Q 15/00*** | (2006.01) |
| ***H01Q 21/26*** | (2006.01) |

(52) U.S. Cl.
CPC ........... *H01Q 5/42* (2015.01); *H01Q 15/0013* (2013.01); *H01Q 21/26* (2013.01)

(56) References Cited

U.S. PATENT DOCUMENTS

| | | | | |
|---|---|---|---|---|
| 2011/0210903 | A1 | 9/2011 | Sarabandi et al. | |
| 2014/0118196 | A1* | 5/2014 | Koskiniemi | H01Q 21/205 343/702 |
| 2018/0269577 | A1* | 9/2018 | Kosaka | H01Q 5/48 |
| 2021/0305717 | A1* | 9/2021 | Hou | H01Q 19/185 |
| 2023/0216205 | A1* | 7/2023 | Li | H01Q 1/246 343/835 |

FOREIGN PATENT DOCUMENTS

| | | | |
|---|---|---|---|
| JP | 2015053660 | A | 3/2015 |
| JP | 2015053661 | A | 3/2015 |
| WO | 2015084208 | A1 | 6/2015 |

* cited by examiner

ANTENNA SYSTEM AND BASE STATION ANTENNA FEEDER SYSTEM

CROSS-REFERENCE TO RELATED APPLICATIONS

This filing is a continuation of International Patent Application No. PCT/CN2022/121392 filed on Sep. 26, 2022, which claims priority to Chinese Patent Application No. 202111162182.9 filed on Sep. 30, 2021. The disclosures of the aforementioned applications are hereby incorporated by reference in their entireties.

TECHNICAL FIELD

Disclosed embodiments relate to the field of communication technologies, and specifically, to an antenna system and a base station antenna feeder system.

BACKGROUND

With development of wireless communication technologies, a base station can support more communication frequency bands. In this case, a structure of a base station antenna is increasingly complex. As antenna arrays in a large quantity of frequency bands and feeder networks are integrated on a single antenna, antenna integration of the single antenna is increasingly high.

In conventional technologies, to implement high integration of an antenna system, antenna unit arrays in a plurality of frequency bands are integrated into one antenna system to form a multi-frequency band antenna system. The multi-frequency band antenna system may include a first frequency band radiation element array and a second frequency band radiation element array, and a frequency selective surface (FSS) may be disposed between the first frequency band radiation element array and the second frequency band radiation element array. However, as an area of the frequency selective surface is limited, space for disposing the first frequency band radiation element array and the second frequency band radiation element array is limited. Consequently, integration of an antenna is low.

SUMMARY

This disclosure provides an antenna system and a base station antenna feeder system. The antenna system includes radiation element arrays in at least two frequency bands. The antenna system has better signal quality and higher integration. In addition, independent evolution of radiation element arrays in different frequency bands can be implemented.

According to a first aspect, an antenna system includes a frequency selective surface, a first frequency band radiation element array, a second frequency band radiation element array, and a phase shifter. The first frequency band radiation element array, the frequency selective surface, and the second frequency band radiation element array are sequentially disposed. In other words, the frequency selective surface is disposed between the first frequency band radiation element array and the second frequency band radiation element array. The frequency selective surface is configured to reflect a signal of the first frequency band radiation element array and transmit a signal of the second frequency band radiation element array. The signal includes an emitted signal and also includes a received signal. The phase shifter is connected to the first frequency band radiation element array, so that the phase shifter is configured to feed the first frequency band radiation element array. The phase shifter includes a cavity, where the cavity is disposed at an edge of the frequency selective surface, and a first extension direction of the cavity is consistent with a second extension direction of the first frequency band radiation element array. In this technical solution, the cavity of the phase shifter is disposed at the edge of the frequency selective surface, and when the signal of the second frequency band radiation element array is transmitted from the frequency selective surface, an insertion loss is small. This helps improve signal quality of the antenna system. In addition, when the second frequency band radiation element array is disposed, there is no need to consider possible interference that is caused by the first frequency band radiation element array to the second frequency band radiation element array. This helps implement decoupling between the first frequency band radiation element array and the second frequency band radiation element array, to flexibly dispose the first frequency band radiation element array and the second frequency band radiation element array as required. In addition, in this solution, the frequency selective surface may be disposed in space of the entire antenna system that faces an antenna, and there is no need to additionally dispose an auxiliary structure of the phase shifter. Therefore, a side that is of the frequency selective surface and that is away from the first frequency band radiation element array may have larger space for disposing the second frequency band radiation element array. In this way, integration of the antenna system is improved. In this solution, the first frequency band radiation element array and the second frequency band radiation element array are arranged in a stacked manner, so that radiation element arrays in at least two frequency bands can be deployed on a single antenna. From the perspective of a direction perpendicular to a surface of the frequency selective surface, the antenna system wholly occupies the antenna, and deployment is easy. In addition, the integration of the antenna system is high, and in this case, an area of the antenna system is small, and wind load is small.

The frequency selective surface includes a first side edge and a second side edge. The first side edge and the second side edge may be two opposite side edges of the frequency selective surface. The phase shifter includes a first phase shifter and a second phase shifter, where a cavity of the first phase shifter is disposed at the first side edge, and a cavity of the second phase shifter is disposed at the second side edge. A first frequency band radiation element includes a first array and a second array. The first phase shifter is connected to the first array, and is configured to feed the first array. The second phase shifter is connected to the second array, and is configured to feed the second array.

The phase shifter further includes a phase shift circuit, and the phase shift circuit is disposed at the cavity. A radiation element of the first frequency band radiation element array includes a first balun, and the first balun includes a first outer conductor and a first inner conductor. The radiation element of the first frequency band radiation element array includes a first radiation arm and a second radiation arm that are co-polarized. The first outer conductor is connected to the first radiation arm and the cavity, and the first inner conductor is connected to the second radiation arm and the phase shift circuit. In other words, the first radiation arm is connected to the cavity via the first outer conductor, and the second radiation arm is connected to the phase shift circuit via the first inner conductor. In this solution, the first balun is directly electrically connected to the phase shifter. In this solution, there is no need to use the frequency selective surface to transfer a signal between the first balun and the phase shifter. A transmission path of the signal is short. In this case, an insertion loss of the signal is small. This helps improve a gain of the first frequency band radiation element array, and improve performance of the antenna system. In addition, in this solution, there is no need to use the frequency selective surface to transfer the signal between the first balun and the phase shifter. In this case, interference of the frequency selective surface to the second frequency band radiation element array is small. This helps improve a gain of the second frequency band radiation element array, and can also improve the performance of the antenna system.

The radiation element of the first frequency band radiation element array may include a group of a first radiation arm and a second radiation arm that are co-polarized, or may include two groups of first radiation arms and second radiation arms that are co-polarized, and each group has a different polarization direction. This is not limited in this disclosure.

When the first balun is disposed, an included angle between the first balun and the frequency selective surface may be an acute angle. In other words, the first balun is inclined toward a center of the frequency selective surface. According to this solution, a projection of the first frequency band radiation element array on the frequency selective surface may be completely located on the frequency selective surface. In this solution, the frequency selective surface may completely reflect the signal of the first frequency band radiation element array, to improve the gain of the first frequency band radiation element array.

For the second frequency band radiation element array located on a rear side of the frequency selective surface, a projection of the second frequency band radiation element array on the frequency selective surface may be completely located on the frequency selective surface, or may be partially located on the frequency selective surface. This is not limited in this disclosure.

The antenna system may further include a reflection plate. The reflection plate is disposed on a side that is of the second frequency band radiation element array and that is away from the frequency selective surface, and is configured to reflect the signal of the second frequency band radiation element array. The signal includes a signal sent to the second frequency band radiation element array and a signal emitted by the second frequency band radiation element array. According to this solution, the gain of the second frequency band radiation element array may be improved.

A length of the cavity in the first extension direction is greater than or equal to a length of the first frequency band radiation element array in the second extension direction. According to this solution, all radiation elements of the first frequency band radiation element array may be directly disposed in the cavity, to reduce a length of a connection structure between the radiation elements and the cavity, reduce the insertion loss, and improve signal quality of the first frequency band radiation element array. In addition, this solution further helps improve overall strength of the antenna system.

The first frequency band radiation element array may be a passive radiation element array. The first frequency band radiation element array does not interfere with the second frequency band radiation element array disposed on the rear side of the frequency selective surface, to implement stacking of the radiation element arrays. The second frequency band radiation element array may be a passive radiation element array or an active radiation element array. This is not limited in this disclosure.

A frequency band of the first frequency band radiation element array is less than a frequency band of the second frequency band radiation element array. A smaller frequency band of a radiation element array indicates a larger size of the radiation element. This solution helps enable a size of a radiation element disposed on a front side of the frequency selective surface to be large among radiation elements of the entire antenna system, so that an appearance of the antenna system is regular, and the wind load of the antenna system may also be small.

When the antenna system in this disclosure is disposed, a radiation surface of the first frequency band radiation element array may be parallel to the frequency selective surface, and a radiation surface of the second frequency band radiation element array may be parallel to the frequency selective surface. In other words, the radiation surface of the first frequency band radiation element array, the radiation surface of the second frequency band radiation element array, and the frequency selective surface are all disposed in parallel. In this case, directions of signal beams emitted and received by the first frequency band radiation element array are the same as directions of signal beams emitted and received by the second frequency band radiation element array. This solution helps improve accuracy of signal coverage of the antenna system.

When the antenna system is disposed, the antenna system may include a first radome and a second radome. The first frequency band radiation element array is disposed in the first radome, and the second frequency band radiation element array is disposed in the second radome. This solution helps implement independent evolution of the first frequency band radiation element array and the second frequency band radiation element array.

When the antenna system is mounted, the first radome has a first mounting structure, and the first radome is fastened or otherwise connected to the second radome to form an integrated structure. The first mounting structure is mounted on a pole, so that the entire antenna system may be mounted on the pole. This solution helps simplify a process of mounting the antenna system.

The second radome may further have a second mounting structure. Both the first mounting structure and the second mounting structure are mounted on the pole. In this solution, the first radome and the second radome may be independently mounted. In this case, a decoupling level between the first frequency band radiation element array and the second frequency band radiation element array is higher, and this better helps implement the independent evolution of the first frequency band radiation element array or the second frequency band radiation element array.

The antenna system further includes a third frequency band radiation element array, and the third frequency band radiation element array and the first frequency band radiation element array are located on a same side of the frequency selective surface. A frequency band of the third frequency band radiation element array is different from the frequency band of the first frequency band radiation element array. In other words, the side that is of the frequency selective surface and on which the first frequency band radiation element array is located may have radiation element arrays in at least two frequency bands.

Except that the frequency band of the third frequency band radiation element array is different from the frequency band of the first frequency band radiation element array, other features of the third frequency band radiation element array may be the same as features of the first frequency band radiation element array. For example, the third frequency band radiation element array is also a passive radiation element array, and the frequency band of the third frequency band radiation element array is also less than the frequency band of the second frequency band radiation element array.

When the third frequency band radiation element array is disposed, both the third frequency band radiation element array and the first frequency band radiation element array may be disposed in the first radome, to simplify a structure of the antenna system.

The antenna system may further include a fourth frequency band radiation element array. The fourth frequency band radiation element array and the second frequency band radiation element array are located on a same side of the frequency selective surface. A frequency band of the fourth frequency band radiation element array is different from the frequency band of the second frequency band radiation element array. In other words, the side that is of the frequency selective surface and on which the second frequency band radiation element array is located may have radiation element arrays in at least two frequency bands.

Except that the frequency band of the fourth frequency band radiation element array is different from the frequency band of the second frequency band radiation element array, other features of the fourth frequency band radiation element array may be the same as features of the second frequency band radiation element array. For example, the frequency band of the fourth frequency band radiation element array is also greater than the frequency band of the first frequency band radiation element array.

When the fourth frequency band radiation element array is disposed, both the fourth frequency band radiation element array and the second frequency band radiation element array may be located in the second radome. Alternatively, in another technical solution, the antenna system further includes a third radome, and the fourth frequency band radiation element array is disposed in the third radome. In this way, radiation element arrays in different frequency bands are disposed in different radomes, to facilitate independent evolution of the second frequency band radiation element array and the fourth frequency band radiation element array.

When the third radome is mounted, the third radome may be fastened or otherwise connected to the first radome, and then mounted on the pole. Alternatively, the third radome may be further provided with a third mounting structure, and the third mounting structure is mounted on the pole. In other words, the fourth frequency band radiation element array may be independently mounted on the pole, to facilitate independent evolution of the fourth frequency band radiation element array.

According to a second aspect, this disclosure further provides a base station antenna feeder system. The base station antenna feeder system includes the antenna system according to the first aspect, and further includes a pole. The antenna system is mounted on the pole. In this solution, the base station antenna feeder system has high integration, antenna signal quality is good. This helps perform independent evolution.

REFERENCE NUMERALS

1—antenna system; 11—radome;
111—first radome; 1111—first mounting structure;
112—second radome; 1121—second mounting structure;
113—third radome; 1131—third mounting structure;
12—radiation element array; 121—first frequency band radiation element array;
1211—first array; 1212—second array;
1213—first balun; 1215—first outer conductor;
1214—first inner conductor; 1216—first radiation arm;
1217—second radiation arm; 122—second frequency band radiation element array;
123—third frequency band radiation element array; 1231—second balun;

124—fourth frequency band radiation element array; 13—reflection plate;
14—feeder network; 141—drive part;
142—calibration network; 143—phase shifter;
1431—cavity; 1432—phase shift circuit;
1433—first phase shifter; 1434—second phase shifter;
144—combiner; 145—filter;
15—frequency selective surface; 151—first side edge;
152—second side edge; 153—third side edge;
154—fourth side edge; 2—pole;
3—antenna adjustment support; 5—radio frequency processing unit;
6—baseband processing unit; 7—cable.

DESCRIPTION OF EMBODIMENTS

Figure 1:
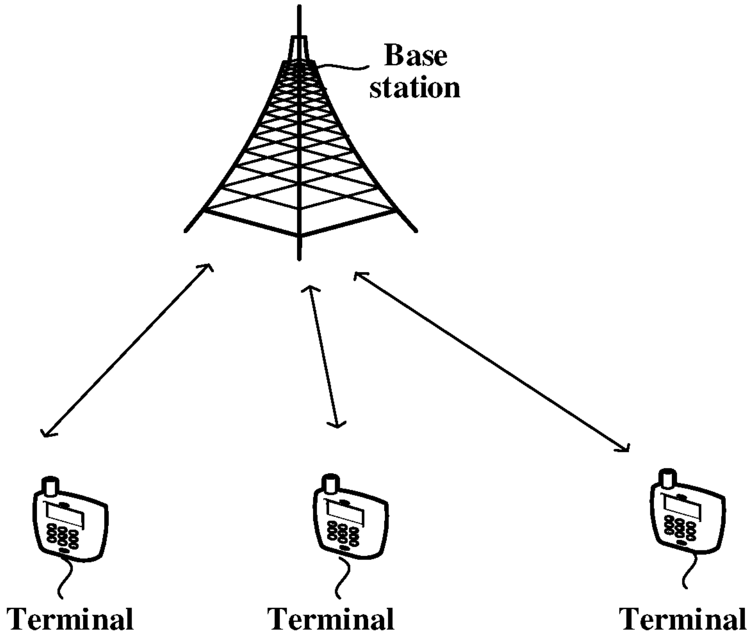
FIG. 1 is a schematic diagram of an architecture of a system to which an embodiment of this disclosure is applicable.

To facilitate understanding of an antenna system and a base station antenna feeder system provided in embodiments of this disclosure, the following describes an application scenario of the antenna system and the base station antenna system. For example, as shown in FIG. 1, the application scenario may include a base station and terminals. Wireless communication may be implemented between the base station and the terminal. The base station may be located in a base station subsystem (BSS), a terrestrial radio access network (UTRAN), or an evolved terrestrial radio access network (E-UTRAN), and is configured to perform cell coverage of a radio signal, to implement communication between a terminal device and a wireless network. Specifically, the base station may be a global system for mobile communication (GSM) or a base transceiver station (BTS) in a code division multiple access (CDMA) system, or may be a NodeB (NB) in a wideband code division multiple access (WCDMA) system, or may be an evolved NodeB (eNB or eNodeB) in a long term evolution (LTE) system, or may be a radio controller in a cloud radio access network (CRAN) scenario. Alternatively, the base station may be a relay station, an access point, a vehicle-mounted device, a wearable device, a gNodeB (gNB) in a new radio (NR) system, a base station in a future evolved network, or the like. This is not limited in this embodiment of this disclosure.

Figure 2:
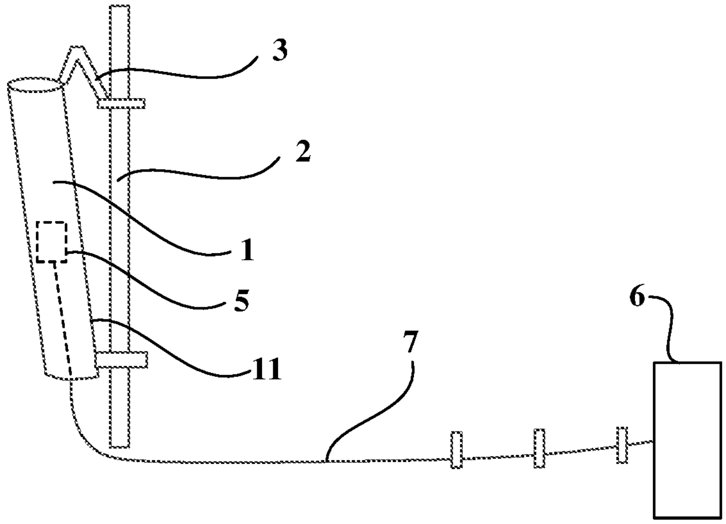
FIG. 2 is a schematic diagram of a structure of a base station antenna feeder system according to a possible embodiment of this disclosure.

FIG. 2 is a schematic diagram of a base station antenna feeder system. The base station antenna feeder system may generally include an antenna system 1, a pole 2, an antenna adjustment support 3, and other structures. The antenna system 1 of a base station includes a radome 11. The radome 11 has a good electromagnetic wave penetration characteristic in terms of electrical performance, and can withstand impact of an external harsh environment in terms of mechanical performance, so that the radome 11 may protect the antenna system 1 from impact of the external environment. The antenna system 1 may be mounted on the pole 2 or a tower by using the antenna adjustment support 3, to facilitate receiving or emitting of a signal of the antenna system 1.

The base station may further include a radio frequency processing unit 5 and a baseband processing unit 6. For example, the radio frequency processing unit 5 may be configured to perform frequency selection, amplification, and down-conversion processing on a signal received by the antenna system 1, and convert the signal into an intermediate frequency signal or a baseband signal and send the intermediate frequency signal or the baseband signal to the baseband processing unit 6; or the radio frequency processing unit 5 is configured to perform up-conversion and amplification processing on the baseband processing unit 6 or an intermediate frequency signal, and convert the baseband processing unit 6 and the intermediate frequency signal into an electromagnetic wave and send the electromagnetic wave out over the antenna system 1. The baseband processing unit 6 may be connected to a feeder network of the antenna system 1 via the radio frequency processing unit 5. In some implementations, the radio frequency processing unit 5 may also be referred to as a remote radio unit (RRU), and the baseband processing unit 6 may also be referred to as a baseband unit (BBU).

As shown in FIG. 2, the radio frequency processing unit 5 may be integrated with the antenna system 1, and the baseband processing unit 6 is located at a remote end of the antenna system 1. In some other embodiments, the radio frequency processing unit 5 and the baseband processing unit 6 may alternatively be located at the remote end of the antenna system 1 at the same time. The radio frequency processing unit 5 and the baseband processing unit 6 may be connected through a cable 7.

Figure 3:
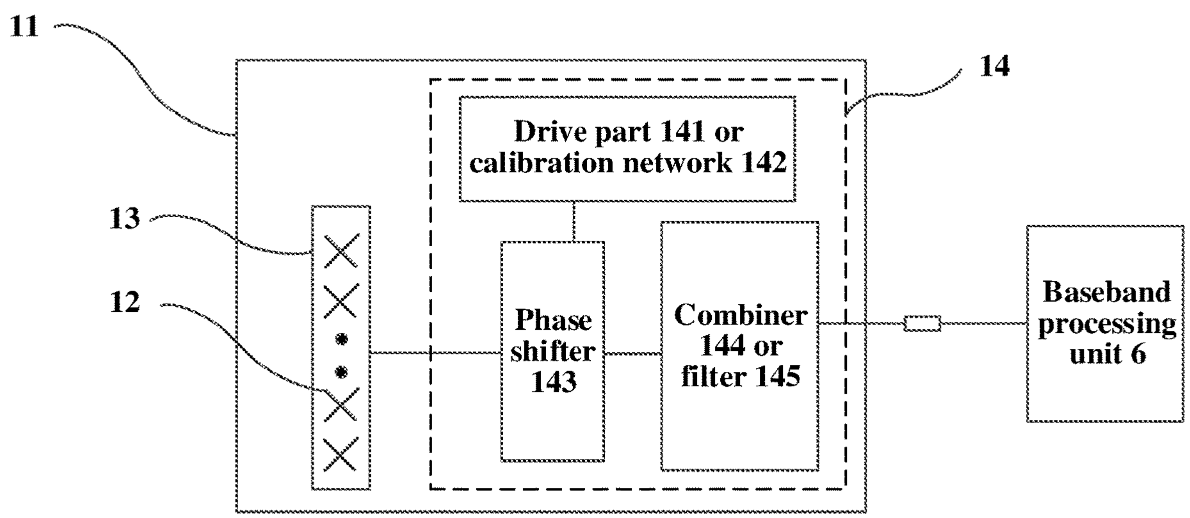
FIG. 3 is a schematic diagram of composition of an antenna system according to a possible embodiment of this disclosure.

With continuing reference to FIG. 2, FIG. 3 depicts a base station antenna system 1 that may include a radiation element array 12 and a reflection plate 13. The radiation element array 12 may also be referred to as an antenna element, an element, or the like, and can effectively send or receive an antenna signal. In the antenna system 1, frequencies of different radiation element arrays 12 may be the same or different. The reflection plate 13 may also be referred to as a bottom plate, an antenna panel, a reflection surface, or the like, and may be made of a metal material. When the antenna system 1 receives a signal, the reflection plate 13 may concentrate reflection of an antenna signal at a receiving point. When the antenna system 1 emits a signal, a signal that is emitted to the reflection plate 13 is reflected and emitted. The radiation element array 12 is generally disposed on a surface of one side of the reflection plate 13. This not only can greatly enhance signal receiving or emitting capabilities of the antenna system 1, but also can block and shield interference caused by another electric wave from a back of the reflection plate 13 (in this disclosure, the back of the reflection plate 13 refers to a side opposite to the side that is of the reflection plate 13 and that is for disposing the radiation element array 12) to antenna signal receiving.

In the antenna system 1 of the base station, the radiation element array 12 is connected to a feeder network 14. The feeder network 14 is generally formed by a controlled impedance transmission line. The feeder network 14 may feed a signal to the radiation element array 12 based on a specific amplitude and phase, or send a received signal to the baseband processing unit 6 of the base station based on a specific amplitude and phase. Specifically, in some implementations, the feeder network 14 may implement different radiation beam directions by using a drive part 141, or may be connected to a calibration network 142 to obtain a calibration signal needed by the system. The feeder network 14 may include a phase shifter 143, configured to change a maximum direction of antenna signal radiation. Some modules for performance extension may be further disposed in the feeder network 14, for example, a combiner 144. The combiner 144 may be configured to combine signals with different frequencies into one path and emit the signals by using the antenna system 1. When used in reverse, the combiner 144 may be configured to divide, based on different frequencies, signals received by the antenna system 1 into a plurality of paths and send the signals on the plurality of paths to the baseband processing unit 6 for processing. The modules may be, for another example, a filter 145. The filter 145 is configured to filter out an interference signal.

Figure 4:
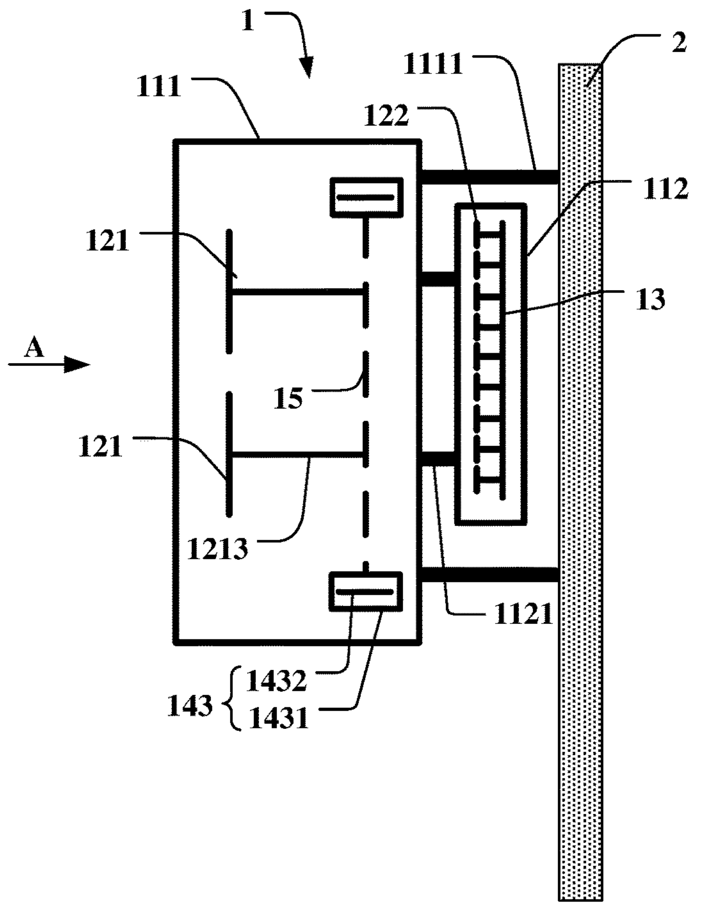
FIG. 4 is a schematic diagram of composition of an antenna system according to a possible embodiment of this disclosure.

FIG. 4 is a schematic diagram of an antenna system according to a possible embodiment of this disclosure. As shown in FIG. 4, an antenna system 1 of a base station includes an FSS 15, a first frequency band radiation element array 121, a second frequency band radiation element array 122, and a phase shifter 143. When structures of the antenna system are specifically disposed, the FSS 15 is located between the first frequency band radiation element array 121 and the second frequency band radiation element array 122, and the FSS 15 is configured to reflect a signal of the first frequency band radiation element array 121 and transmit a signal of the second frequency band radiation element array 122. The signal of the first frequency band radiation element array 121 includes a signal received by the first frequency band radiation element array 121 and a signal emitted by the first frequency band radiation element array 121. The signal of the second frequency band radiation element array 122 includes a signal received by the second frequency band radiation element array 122 and a signal emitted by the second frequency band radiation element array 122. In this solution, the FSS 15 is disposed, so that the first frequency band radiation element array 121 and the second frequency band radiation element array 122 may be stacked in a direction perpendicular to a pole. In other words, the first frequency band radiation element array 121 and the second frequency band radiation element array 122 are arranged side by side (SBS). In this way, integration of the antenna system 1 in one antenna space is improved. The phase shifter 143 includes a cavity 1431 and a phase shift circuit 1432. The phase shift circuit 1432 is disposed at the cavity 1431. Specifically, the first frequency band radiation element array 121 may be connected to the phase shifter 143, so that the phase shifter 143 is configured to feed the first frequency band radiation element array 121. In a specific embodiment, a manner of connecting the first frequency band radiation element array 121 and the phase shifter 143 is not limited. For example, in the embodiment shown in FIG. 4, the first frequency band radiation element array 121 is directly electrically connected to the phase shifter 143 via the metal FSS 15. In addition, the first frequency band radiation element array 121 may alternatively be directly electrically connected to the phase shifter 143 via a balun of a radiation element. The electrical connection between the first frequency band radiation element array 121 and the phase shifter 143 may be a direct electrical connection, or may be a coupling electrical connection. This is also not limited in this disclosure. The cavity 1431 is disposed at an edge of the FSS 15. The cavity 1431 may be configured with an elongated strip-shape, and in this case, a first extension direction of the cavity 1431 is consistent with a second extension direction of the first frequency band radiation element array 121.

In a specific embodiment, one phase shifter 143 may include one or more cavities 1431. For example, when the second frequency band radiation element array 122 includes a dual-polarized radiation element, the phase shifter 143 includes two cavities 1431, where the two cavities are configured to be correspondingly connected to one column of second frequency band radiation element arrays 122. In the accompanying drawings of embodiments of this disclosure, an example in which the phase shifter 143 includes one cavity 1431 is used for description. The cavity 1431 may be a cavity 1431 having a closed cross section, or may be a cavity 1431 having a non-closed cross section. The cavity 1431 is configured to form a ground layer of the phase shift circuit 1432 of the phase shifter 143. The phase shift circuit 1432 is disposed at the cavity 1431, and a specific disposition position of the phase shift circuit 1432 is not limited. For example, when the cavity 1431 is the cavity 1431 having the closed cross section, that the phase shift circuit 1432 is disposed at the cavity 1431 may be understood as that the phase shift circuit 1432 may be disposed inside the cavity 1431, or may be disposed on an outer surface of the cavity 1431.

In this embodiment, the cavity 1431 of the phase shifter 143 is disposed at the edge of the FSS 15, and in this case, no structure that may cause interference exists on a surface of the entire FSS 15. When the signal of the second frequency band radiation element array 122 passes through the FSS 15, an insertion loss is small. This helps improve signal quality of the antenna system 1. In addition, when the second frequency band radiation element array 122 is disposed, there is no need to consider interference that is caused by the first frequency band radiation element array 121 to the second frequency band radiation element array 122. This helps implement decoupling between the first frequency band radiation element array 121 and the second frequency band radiation element array 122. In other words, signal interference and the like of the second frequency band radiation element array 122 caused to the first frequency band radiation element array 121 may not be taken into consideration for design and layout of the first frequency band radiation element array 121. Similarly, signal interference and the like of the first frequency band radiation element array 121 caused to the second frequency band radiation element array 122 may not be taken into consideration for design and layout of the second frequency band radiation element array 122, either. In this way, the first frequency band radiation element array 121 and the second frequency band radiation element array 122 are flexibly disposed as required. In addition, in conventional technologies, an FSS and a reflection plate carrying a phase shifter need to be disposed side by side in space of an antenna system that faces an antenna. The reflection plate is configured to carry the phase shifter, and reflect a signal of the first frequency band radiation element array. However, the reflection plate cannot transmit a signal of the second frequency band radiation element array, so that the second frequency band radiation element array cannot be disposed on a side that is of the reflection plate and that is away from the first frequency band radiation element array. Consequently, space for disposing the second frequency band radiation element array is limited. In this embodiment of this disclosure, there is no need to dispose a reflection plate for carrying the phase shifter. In this case, the FSS 15 having a larger area may be disposed. Therefore, there is larger space on a side that is of the FSS 15 and that is away from the first frequency band radiation element array 121, to dispose the second frequency band radiation element array 122. In this way, integration of the antenna system 1 can be improved. In this solution, the first frequency band radiation element array 121 and the second frequency band radiation element array 122 are arranged in the SBS manner, so that radiation element arrays in at least two frequency bands can be deployed on a single antenna. From the perspective of a front direction of the antenna system 1, in other words, in a direction perpendicular to the surface of the FSS 15, the antenna system 1 wholly occupies the antenna, and deployment is easy. In addition, the integration of the antenna system 1 is high, and in this case, an area of the antenna system 1 is small, and wind load is small.

When the antenna system 1 is mounted, a side that is of the second frequency band radiation element array 122 of the antenna system 1 and that is away from the first frequency band radiation element array 121 may be mounted on the pole 2. In other words, the first frequency band radiation element array 121, the FSS 15, and the second frequency band radiation element array 122 are sequentially disposed in a direction facing the pole 2. A direction that is of the FSS 15 and that is away from the pole 2 indicates a front side, and the direction that is of the FSS 15 and that faces the pole 2 indicates a rear side. A signal generated by the first frequency band radiation element array 121 is directly emitted to the front side of the FSS 15, and the FSS 15 may reflect the signal that is generated by the first frequency band radiation element array 121 and that faces the FSS 15. A signal generated by the second frequency band radiation element array 122 may pass through the FSS 15, and may also be emitted to the front side of the FSS 15. In this solution, the cavity 1431 of the phase shifter 143 is disposed at the edge of the FSS 15, and there is no need to additionally arrange the reflection plate for disposing the phase shifter 143. In this way, the FSS 15 having a larger area may be disposed in the antenna system 1, and the space on the side that is of the FSS 15 and that is away from the first frequency band radiation element array 121 is also large. Therefore, there is large space that is for disposing the second frequency band radiation element array 122 and that is on the rear side of the FSS 15, to improve the integration of the antenna system 1.

In a specific embodiment, the cavity 1431 of the phase shifter 143 may be disposed at the edge of the FSS 15. When the antenna system 1 further includes another part, the another part may also be disposed at the edge of the FSS 15.

Figure 5:
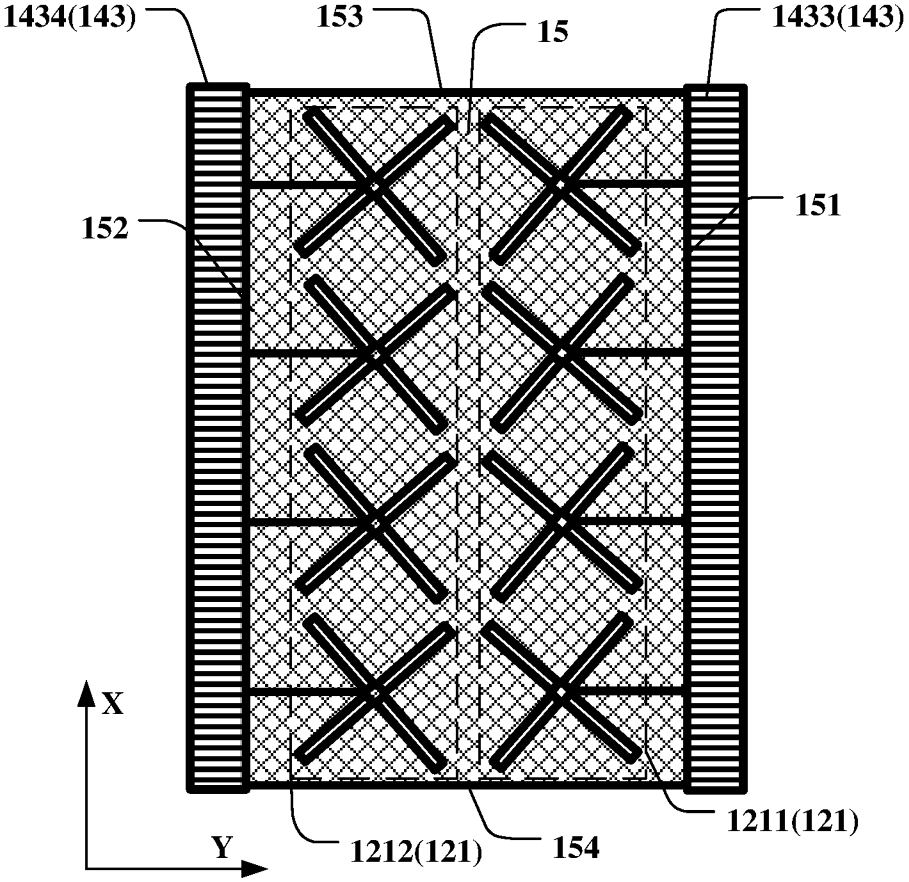
FIG. 5 is a schematic diagram of a structure of an antenna system according to a possible embodiment of this disclosure.

FIG. 5 is a schematic diagram of a structure of an antenna system according to a possible embodiment of this disclosure. Specifically, FIG. 5 is a schematic diagram of a structure of the antenna system in a direction A shown in FIG. 4. As shown in FIG. 5, an example in which the FSS 15 is a rectangle is used to describe disposition of the cavity 1431 in this embodiment of this disclosure. The FSS 15 includes a first side edge 151 and a second side edge 152 that extend in a first direction X, and a third side edge 153 and a fourth side edge 154 that extend in a second direction. The first side edge 151 and the second side edge 152 are disposed opposite to each other, and the third side edge 153 and the fourth side edge 154 are disposed opposite to each other. The phase shifter 143 includes a first phase shifter 1433 and a second phase shifter 1434. The first frequency band radiation element array 121 includes a first array 1211 and a second array 1212. The first phase shifter 1433 is connected to the first array 1211. In other words, the first phase shifter 1433 feeds the first array 1211. The second phase shifter 1434 is connected to the second array 1212. In other words, the second phase shifter 1434 feeds the second array 1212. A cavity 1431 of the first phase shifter 1433 is disposed at the first side edge 151, and a cavity 1431 of the second phase shifter 1434 is disposed at the second side edge 152.

In this embodiment, a length of the first side edge 151 is greater than a length of the third side edge 153, the cavities 1431 are disposed at the first side edge 151 and the second side edge 152 of the FSS 15, the first frequency band radiation element array 121 extends in the first direction X, and the cavities 1431 also extend in the first direction X.

With continuing reference to FIG. 5, a length of the cavity 1431 in the first extension direction is greater than or equal to a length of the first frequency band radiation element array 121 in the second extension direction. According to this solution, all radiation elements of the first frequency band radiation element array 121 may be directly disposed in the cavity 1431, to reduce a length of a connection structure between the radiation elements and the cavity 1431, reduce an insertion loss, and improve signal quality of the first frequency band radiation element array 121. In addition, this solution further helps improve overall strength of the antenna system 1.

Figure 6:
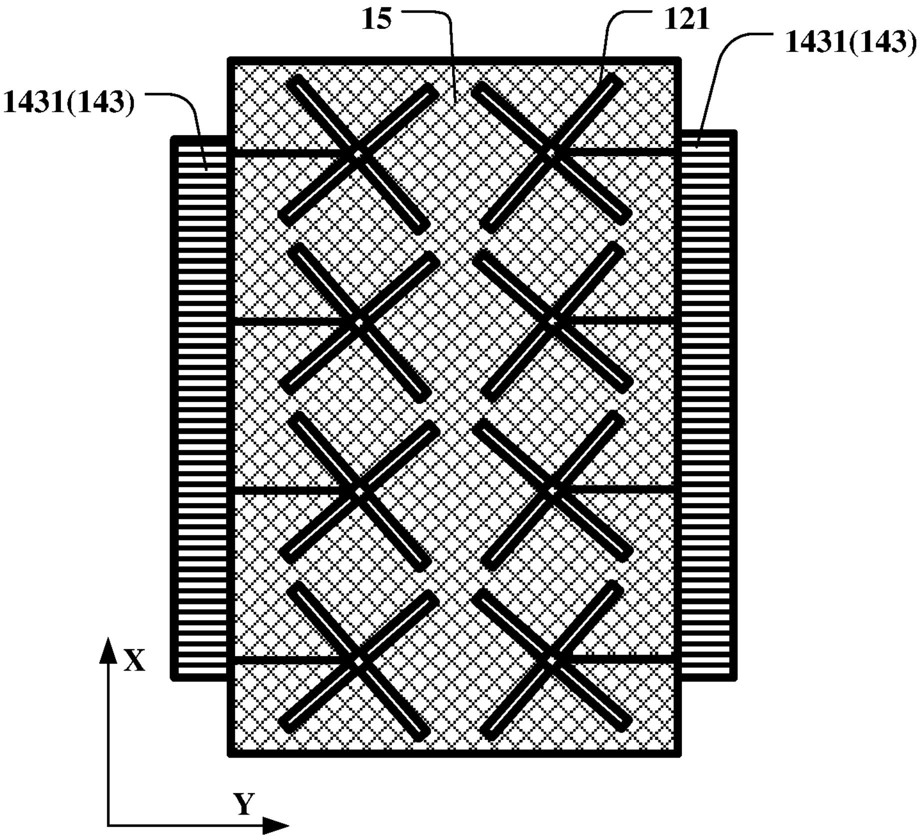
FIG. 6 is a schematic diagram of a structure of an antenna system according to another possible embodiment of this disclosure.

FIG. 6 is a schematic diagram of a structure of an antenna system according to another possible embodiment of this disclosure. Specifically, FIG. 6 is a schematic diagram of another structure of the antenna system in a direction A shown in FIG. 4. As shown in FIG. 6, in another embodiment, a length of the cavity 1431 in the first extension direction may alternatively be less than a length of the first frequency band radiation element array 121 in the first extension direction. In this embodiment, the length of the cavity 1431 in the first extension direction only needs to enable the first frequency band radiation element array 121 to be connected to the cavity 1431.

Figure 7:
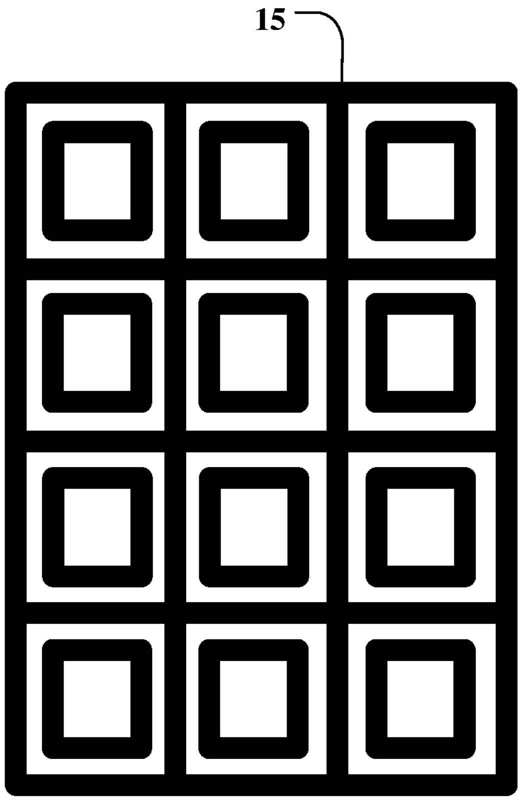
FIG. 7 is a schematic diagram of a structure of a frequency selective surface according to a possible embodiment of this disclosure.
Figure 8:
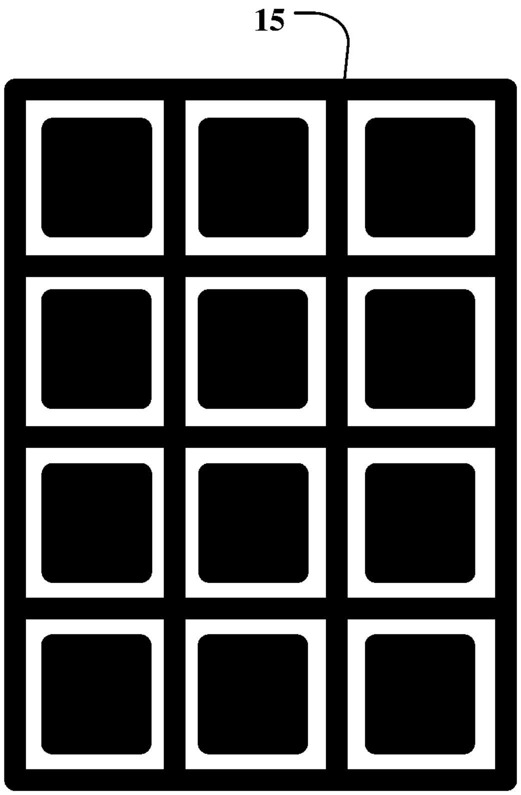
FIG. 8 is a schematic diagram of a structure of a frequency selective surface according to another possible embodiment of this disclosure.
Figure 9:
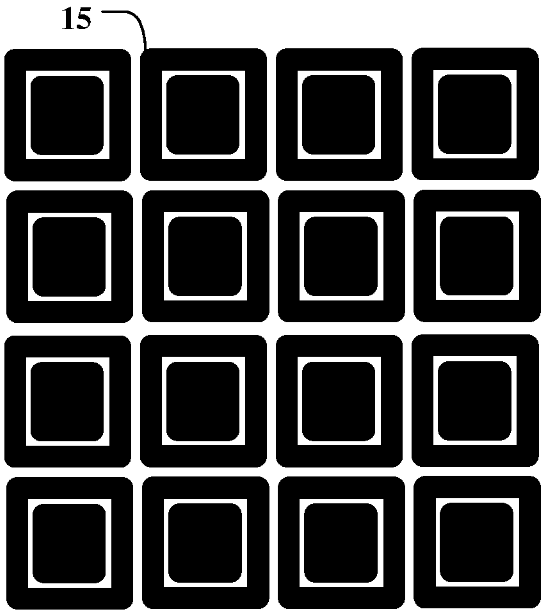
FIG. 9 is a schematic diagram of a structure of a frequency selective surface according to another possible embodiment of this disclosure.

A specific structure of the FSS 15 is not limited in this embodiment, provided that functions of reflecting the signal of the first frequency band radiation element array 121 and transmitting the signal of the second frequency band radiation element array 122 can be implemented. In an embodiment, the FSS 15 may be a grid structure. FIG. 7 is a schematic diagram of a structure of an FSS according to a possible embodiment of this disclosure. In the embodiment shown in FIG. 7, the FSS 15 includes a plurality of spaces, and each space has a rectangular metal frame line. FIG. 8 is a schematic diagram of a structure of an FSS according to another possible embodiment of this disclosure. In the embodiment shown in FIG. 8, the FSS 15 also includes a plurality of spaces, and each space has a rectangular metal sheet. FIG. 9 is a schematic diagram of a structure of an FSS according to another possible embodiment of this disclosure. In the embodiment shown in FIG. 9, the FSS 15 includes a plurality of independent metal frame lines, and each metal frame line has a rectangular metal sheet.

With continuing reference to FIG. 4, a radiation element of the first frequency band radiation element array 121 includes a first balun 1213, and the first balun 1213 is electrically connected to the phase shifter 143. During specific implementation, when the first balun 1213 is electrically connected to the phase shifter 143, the first balun 1213 of the first frequency band radiation element array 121 may be connected to the FSS 15, and then connected to the phase shifter 143 via the FSS 15.

Figure 10:
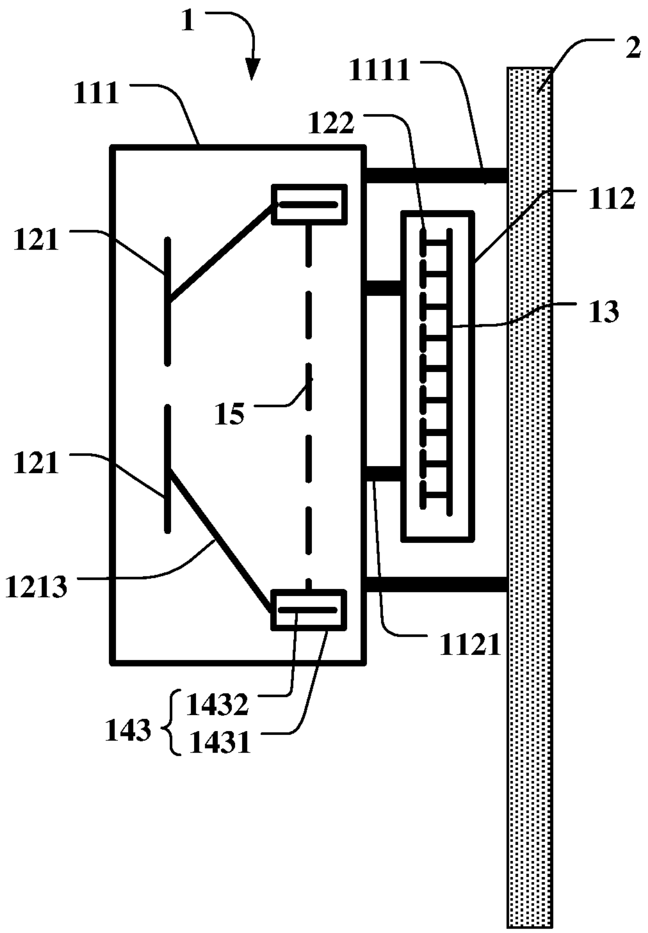
FIG. 10 is a schematic diagram of composition of an antenna system according to another possible embodiment of this disclosure.

FIG. 10 is a schematic diagram of composition of an antenna system according to another possible embodiment of this disclosure. As shown in FIG. 10, a first balun 1213 of a radiation element of a first frequency band radiation element array 121 is directly electrically connected to a phase shifter 143. In this solution, there is no need to use an FSS 15 to transfer a signal between the first balun 1213 and the phase shifter 143. A transmission path of the signal is short. In this case, an insertion loss of the signal is small. This helps improve a gain of the first frequency band radiation element array 121, and improve performance of the antenna system 1. In addition, in this solution, there is no need to use the FSS 15 to transfer the signal between the first balun 1213 and the phase shifter 143. In this case, interference of the FSS 15 to a second frequency band radiation element array 122 is small. This helps improve a gain of the second frequency band radiation element array 122, and can also improve the performance of the antenna system 1.

In this solution, the electrical connection between the first balun 1213 and the phase shifter 143 may be a direct electrical connection, or may be a coupling electrical connection. This is not limited in this disclosure.

Referring to FIG. 6 and FIG. 10, when the first frequency band radiation element array 121 is disposed, a projection of the first frequency band radiation element array 121 on the FSS 15 is completely located on the FSS 15. In this solution, the FSS 15 may completely reflect a signal of the first frequency band radiation element array 121. The signal includes a signal received by the first frequency band radiation element array 121 and a signal emitted by the first frequency band radiation element array 121. According to this solution, the gain of the first frequency band radiation element array 121 may be improved.

For the second frequency band radiation element array 122 located on a rear side of the FSS 15, a projection of the second frequency band radiation element array 122 on the FSS 15 may be completely located on the FSS 15, or may be partially located on the FSS 15. This is not limited in this disclosure.

Referring to FIG. 10, when the first frequency band radiation element array 121 is disposed, to ensure that the projection of the first frequency band radiation element array 121 on the FSS 15 is completely located on the FSS 15, the first balun 1213 and the FSS 15 may be disposed at an acute angle. In this solution, a smaller included angle between the first balun 1213 and the FSS 15 is an acute angle, and the first balun 1213 is inclined toward a center of the FSS 15. It should be noted that, that the first balun 1213 and the FSS 15 are disposed at an acute angle means a disposition trend of an integrated structure of the first balun 1213. In other words, the first balun 1213 may be of a straight-line structure. In addition, as shown in FIG. 7, the first balun 1213 and the FSS 15 may be disposed at an acute angle.

Figure 11:
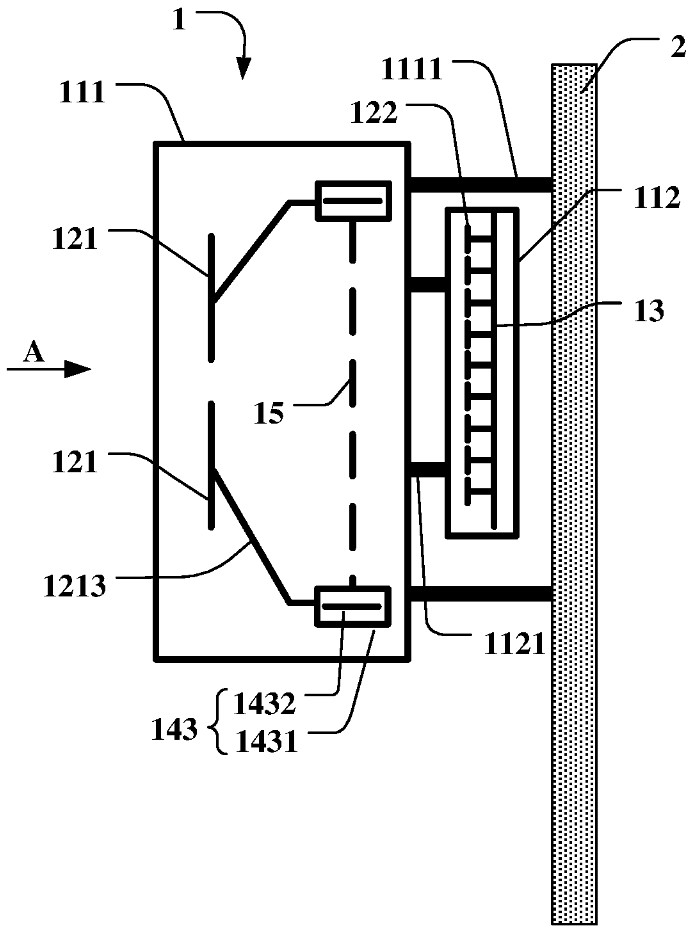
FIG. 11 is a schematic diagram of composition of an antenna system according to another possible embodiment of this disclosure.

Alternatively, in another embodiment, the first balun 1213 may be of a segment structure. FIG. 11 is a schematic diagram of composition of an antenna system according to another possible embodiment of this disclosure. As shown in FIG. 11, in a specific embodiment, a first balun 1213 includes two parts. One part is perpendicular to an FSS 15, and the other part is disposed at an acute angle with the FSS 15. The first balun 1213 in the embodiment shown in FIG. 11 may alternatively be considered to be disposed at an acute angle with the FSS 15. In conclusion, the first balun 1213 needs to be disposed at an acute angle with the FSS 15 on the whole and the first balun 1213 needs to be inclined toward a center of the FSS 15.

Figure 12:
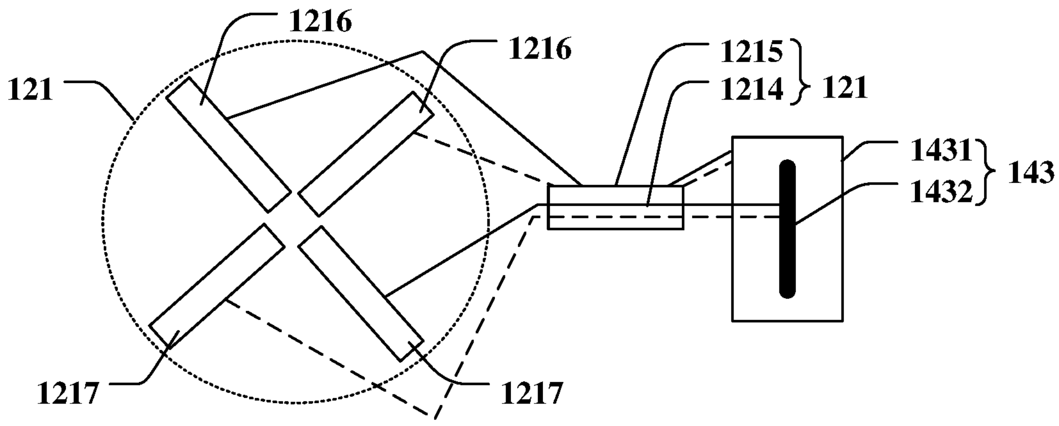
FIG. 12 is a schematic diagram of a connection between a first frequency band radiation element array and a phase shifter according to an embodiment of this disclosure.

FIG. 12 is a schematic diagram of a connection between a first frequency band radiation element array 121 and a phase shifter 143 according to an embodiment of this disclosure. As shown in FIG. 12, in a specific embodiment, the phase shifter 143 further includes a phase shift circuit 1432, and the phase shift circuit 1432 is disposed at a cavity 1431. The first balun 1213 includes a first outer conductor 1215 and a first inner conductor 1214. A radiation element of the first frequency band radiation element array 121 includes two groups of radiation arms in different polarization directions, and each group of radiation arms includes a first radiation arm 1216 and a second radiation arm 1217 that are co-polarized. The first outer conductor 1215 is connected to the first radiation arm 1216 and the cavity 1431, and the first inner conductor 1214 is connected to the second radiation arm 1217 and the phase shift circuit 1432. As shown in FIG. 12, the first radiation arm 1216 and the second radiation arm 1217 that are connected by using straight lines are a group of radiation arms in a same polarization direction, and the first radiation arm 1216 and the second radiation arm 1217 that are connected by using dashed lines are another group of radiation arms in a same polarization direction. The straight lines and the dashed lines in FIG. 12 are merely for distinguishing between the two groups of radiation arms, and actual structures of the two groups of radiation arms are not distinguished. In addition, specific connection manners of the straight lines and the dashed lines may be the same. Details are not described herein.

Still referring to FIG. 11, the antenna system 1 further includes a reflection plate 13. The reflection plate 13 is disposed on a side that is of a second frequency band radiation element array 122 and that is away from the FSS 15. In this solution, the reflection plate 13 is disposed on the side that is of the second frequency band radiation element array 122 and that is away from the FSS 15, and is configured to reflect a signal of the second frequency band radiation element array 122. The signal includes a signal sent to the second frequency band radiation element array 122 and a signal emitted by the second frequency band radiation element array 122. According to this solution, a gain of the second frequency band radiation element array 122 may be improved.

In an embodiment, the second frequency band radiation element array 122 is also connected to a phase shifter. The phase shifter is configured to feed the second frequency band radiation element array 122. A specific disposition position of the phase shifter is not limited in this disclosure. For example, when a reflection plate is disposed on the side that is of the second frequency band radiation element array 122 and that is away from the FSS 15, the phase shifter may be disposed on the reflection plate. Certainly, even if a corresponding reflection plate is not disposed for the second frequency band radiation element array 122, the phase shifter may be mounted by using a mechanical part.

The first frequency band radiation element array 121 may be a passive radiation element array, and the first frequency band radiation element array 121 does not interfere with the second frequency band radiation element array 122 disposed on a rear side of the FSS 15, to implement stacking of radiation element arrays 12. In a specific embodiment, the first frequency band radiation element array 121 may be a fourth generation (4G) low-frequency antenna, and is generally in a frequency band of 690 MHz to 960 MHz. The second frequency band radiation element array 122 may be specifically a passive (Passive) radiation element array or may be an active radiation element array. This is not limited in this disclosure. When the second frequency band radiation element array 122 is the active radiation element array, the second frequency band radiation element array 122 may be a fifth generation (5G) high-frequency antenna, and is generally in a frequency band of 2600 MHz or 3500 MHz. The second frequency band radiation element array 122 may be specifically a massive multiple-input multiple-output (MM) antenna.

In addition, a frequency band of the first frequency band radiation element array 121 may be less than a frequency band of the second frequency band radiation element array 122. Generally, a radiation element array in a smaller frequency band indicates a larger size of a single radiation element. In this solution, a radiation element disposed on a front side of the FSS 15 has a large size in radiation elements of the entire antenna system. Therefore, from the perspective of a direction A in FIG. 11, an appearance of the antenna system 1 is regular, and wind load of the antenna system 1 may also be small.

With continued reference to FIG. 11, when the first frequency band radiation element array 121 and the second frequency band radiation element array 122 are disposed, a radiation surface of the first frequency band radiation element array 121 may be parallel to the FSS 15, and a radiation surface of the second frequency band radiation element array 122 may be parallel to the FSS 15. In this arrangement, both the radiation surface of the first frequency band radiation element array 121 and the radiation surface of the second frequency band radiation element array 122 are parallel to the FSS 15. In this case, directions of signal beams emitted and received by the first frequency band radiation element array 121 are the same as directions of signal beams emitted and received by the second frequency band radiation element array 122. The radiation surface is a surface of the radiation element. When the antenna system 1 in this embodiment is mounted, the directions of the signal beams emitted and received by the first frequency band radiation element array 121 and the directions of the signal beams emitted and received by the second frequency band radiation element array 122 may extend right straight ahead. This helps improve accuracy of signal coverage of the antenna system 1. It should be noted that a "parallel" position relationship means approximately parallel or slightly non-parallel, which is incurred from errors derived from manufacturing and mounting and other processes.

Still referring to FIG. 11, the antenna system 1 includes a first radome 111 and a second radome 112. The first frequency band radiation element array 121 is disposed in the first radome 111, and the second frequency band radiation element array 122 is disposed in the second radome 112. In this solution, the first frequency band radiation element array 121 and the second frequency band radiation element array 122 each have an independent radome, and the first frequency band radiation element array 121 and the second frequency band radiation element array 122 each may be independently mounted and replaced. This solution helps implement decoupling between the first frequency band radiation element array 121 and the second frequency band radiation element array 122, and helps implement independent evolution of the first frequency band radiation element array 121 and the second frequency band radiation element array 122 of the antenna system 1. In this embodiment, the FSS 15 may also be disposed in the first radome 111. In this way, the reflection plate 13 is disposed in the second radome 112.

As shown in FIG. 11, when the antenna system 1 is mounted, the first radome 111 may be fastened or otherwise connected to the second radome 112, so that the antenna system 1 is first fastened or otherwise connected into an integrated structure. Then, the integrated antenna system 1 is mounted on the pole 2. For example, in the embodiment shown in FIG. 11, the first radome 111 has a first mounting structure 1111, and the second radome 112 has a second mounting structure 1121. The first radome 111 and the second radome 112 are connected via the second mounting structure 1121, to form an integrated structure, and then the integrated structure is mounted on the pole via the first mounting structure 1111. In this solution, when the antenna system 1 is mounted on the pole 2, operations are simple.

Figure 13:
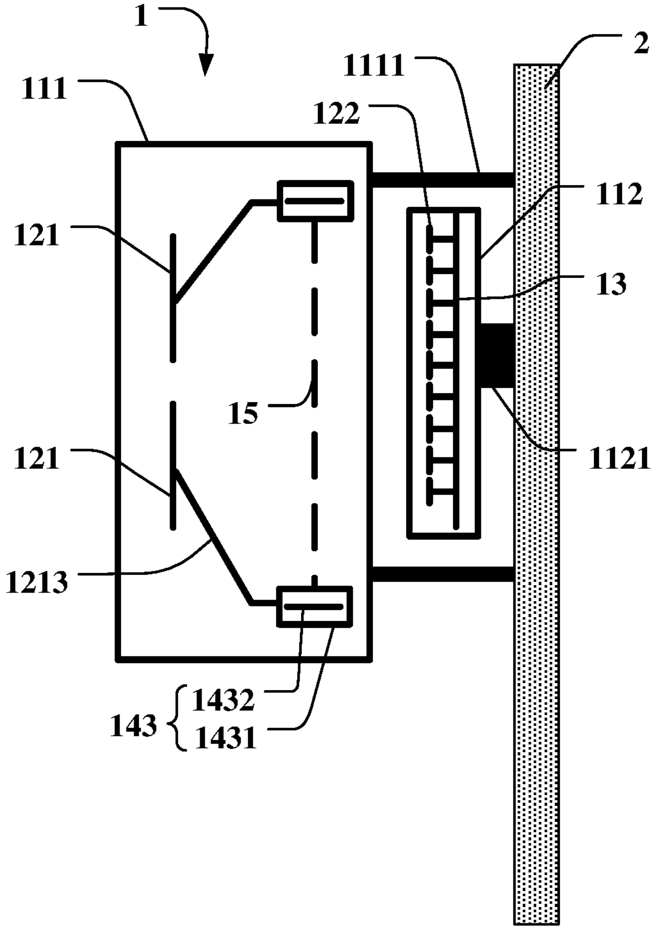
FIG. 13 is a schematic diagram of composition of an antenna system according to another possible embodiment of this disclosure.

FIG. 13 is a schematic diagram of composition of an antenna system according to another possible embodiment of this disclosure. As shown in FIG. 13, in another embodiment, a first radome 111 has a first mounting structure 1111, and the first mounting structure 1111 is mounted on a pole 2. A second radome 112 has a second mounting structure 1121, and the second mounting structure 1121 is also mounted on the pole 2. In this technical solution of this disclosure, radiation element arrays in different frequency bands may be separately mounted on the pole. In this embodiment, a first frequency band radiation element array 121 is completely decoupled from a second frequency band radiation element array 122, to facilitate independent evolution of a radiation element array in each frequency band of the antenna system 1.

Figure 14:
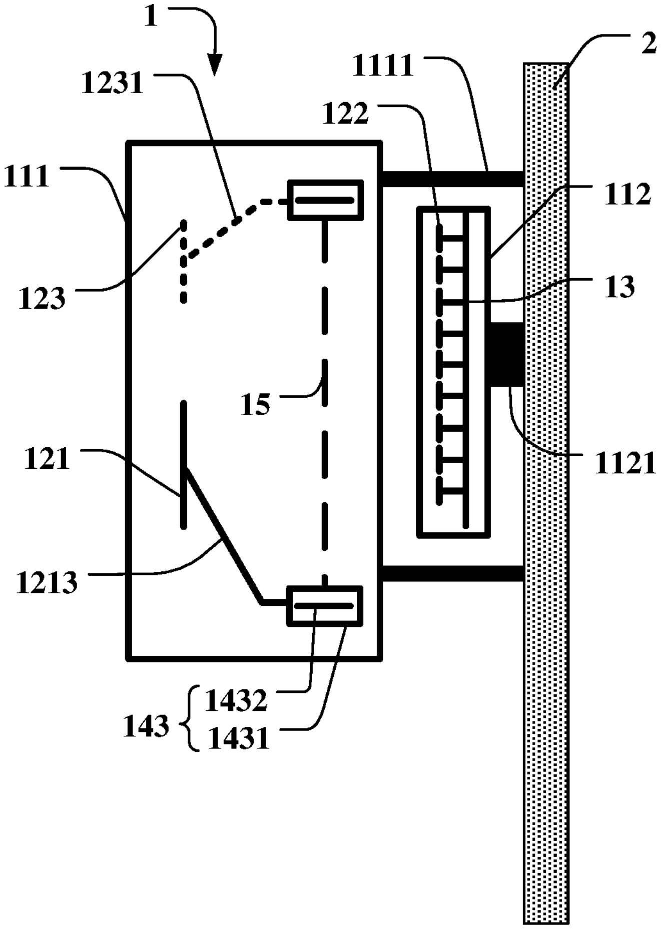
FIG. 14 is a schematic diagram of composition of an antenna system according to another possible embodiment of this disclosure.

FIG. 14 is a schematic diagram of composition of an antenna system according to another possible embodiment of this disclosure. As shown in FIG. 14, in another embodiment, the antenna system 1 further includes a third frequency band radiation element array 123. The third frequency band radiation element array 123 and a first frequency band radiation element array 121 are located on a same side of an FSS 15. In this solution, a quantity of frequency bands of radiation element arrays disposed on a front side of the FSS 15 is not limited, and a radiation element array in one frequency band, radiation element arrays in two frequency bands, or radiation element arrays in more frequency bands may be disposed.

Figure 15:
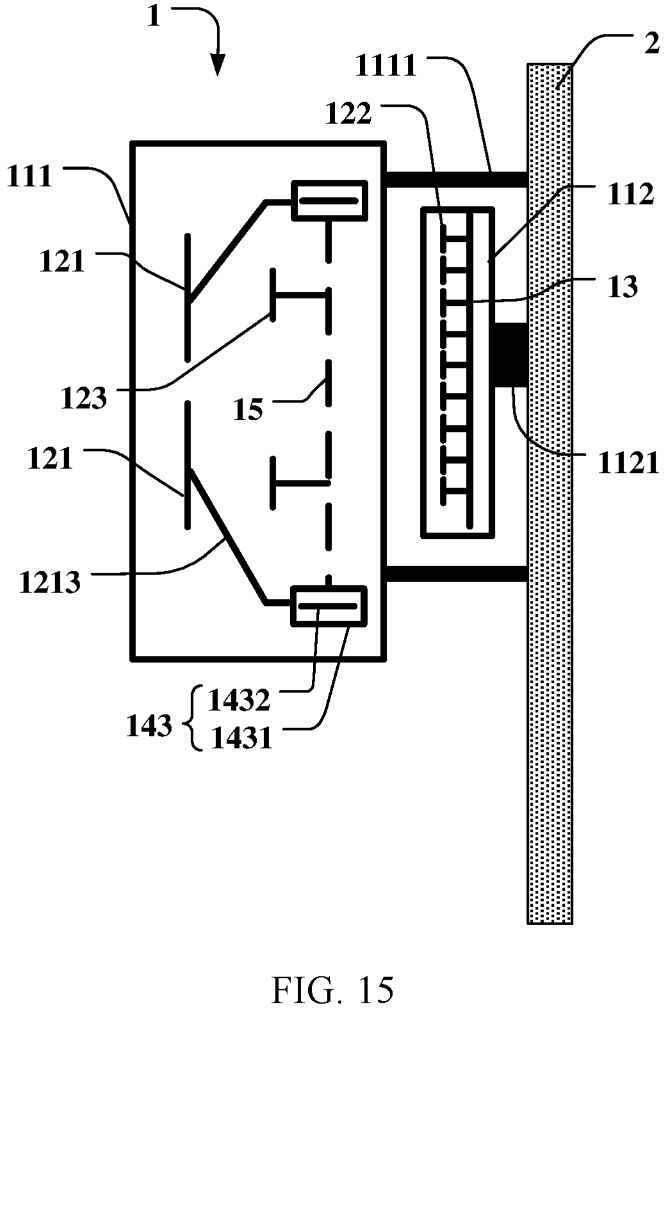
FIG. 15 is a schematic diagram of composition of an antenna system according to another possible embodiment of this disclosure.

As shown in FIG. 14, the third frequency band radiation element array 123 may alternatively be directly disposed in a cavity 1431 and is connected to the cavity 1431 via a second balun 1231. A specific connection manner of the second balun 1231 is the same as a connection manner of a first balun 1213. Details are not described herein. Alternatively, FIG. 15 is a schematic diagram of composition of an antenna system according to another possible embodiment. As shown in FIG. 15, a third frequency band radiation element array 123 may alternatively be disposed on an FSS 15. In this embodiment, a cavity 1431 of a phase shifter 143 connected to the third frequency band radiation element array 123 is also disposed at an edge of the FSS 15. The third frequency band radiation element array 123 in this embodiment is connected to the cavity 1431 via the FSS 15. This is not limited in this disclosure. Specifically, the cavity 1431 of the phase shifter connected to the third frequency band radiation element array 123 and a cavity 1431 of a phase shifter connected to a first frequency band radiation element array 121 may be disposed in parallel at edges of the FSS 15. In an implementation, the cavity 1431 of the phase shifter connected to the third frequency band radiation element array 123 and the cavity 1431 of the phase shifter connected to the first frequency band radiation element array 121 may be fastened or otherwise connected as an integrated structure or integrally formed structure.

Referring to FIG. 14 and FIG. 15, the first frequency band radiation element array 121 and the third frequency band radiation element array 123 in the foregoing embodiments may be disposed in a same radome, for example, both may be disposed in a first radome 111. In addition, the third frequency band radiation element array 123 may be a passive radiation element array. A frequency band of the third frequency band radiation element array 123 may be less than a frequency band of the first frequency band radiation element array 121. Alternatively, the phase shifter 143 connected to the third frequency band radiation element array 123 may be located at the edge (not shown in FIG. 15) of the FSS 15. In conclusion, except that the frequency band of the third frequency band radiation element array 123 is different from the frequency band of the first frequency band radiation element array 121, other features of the third frequency band radiation element array 123 may be the same as features of the first frequency band radiation element array 121 in the foregoing embodiments.

Figure 16:
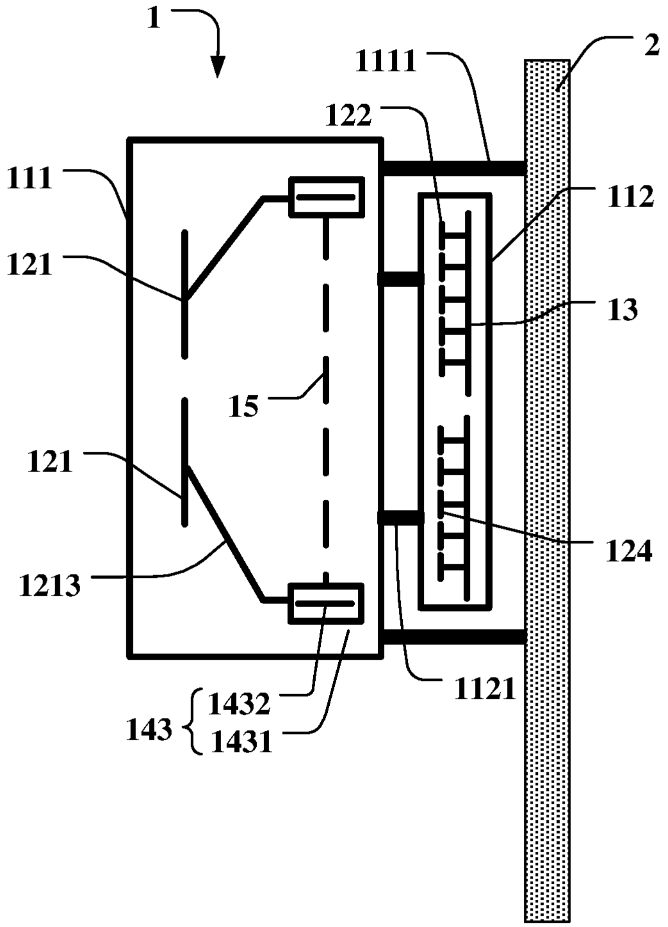
FIG. 16 is a schematic diagram of composition of an antenna system according to another possible embodiment of this disclosure.

FIG. 16 is a schematic diagram of composition of an antenna system according to another possible embodiment of this disclosure. As shown in FIG. 16, the antenna system 1 further includes a fourth frequency band radiation element array 124. The fourth frequency band radiation element array 124 and a second frequency band radiation element array 122 are located on a same side of an FSS 15. In this solution, a quantity of frequency bands of radiation element arrays disposed on a rear side of the FSS 15 is not limited, and a radiation element array in one frequency band, radiation element arrays in two frequency bands, or radiation element arrays in more frequency bands may be disposed.

When the second frequency band radiation element array 122 and the fourth frequency band radiation element array 124 are disposed, the second frequency band radiation element array 122 and the fourth frequency band radiation element array 124 may be disposed in parallel. More specifically, the second frequency band radiation element array 122 and the fourth frequency band radiation element array 124 may be disposed on a same plane. In this way, when both the second frequency band radiation element array 122 and the fourth frequency band radiation element array 124 are active radiation element arrays, a signal blocking problem does not exist.

The fourth frequency band radiation element array 124 may be a passive radiation element array or an active radiation element array. In a specific embodiment, a frequency band of the fourth frequency band radiation element array 124 may be greater than a frequency band of a first frequency band radiation element array 121. In conclusion, except that the frequency band of the fourth frequency band radiation element array 124 is different from a frequency band of the second frequency band radiation element array 122, other features of the fourth frequency band radiation element array 124 may be the same as features of the second frequency band radiation element array 122 in the foregoing embodiments.

As shown in FIG. 16, the second frequency band radiation element array 122 and the fourth frequency band radiation element array 124 in the foregoing embodiment may be disposed in a same radome, for example, both may be disposed in a second radome 112.

Figure 17:
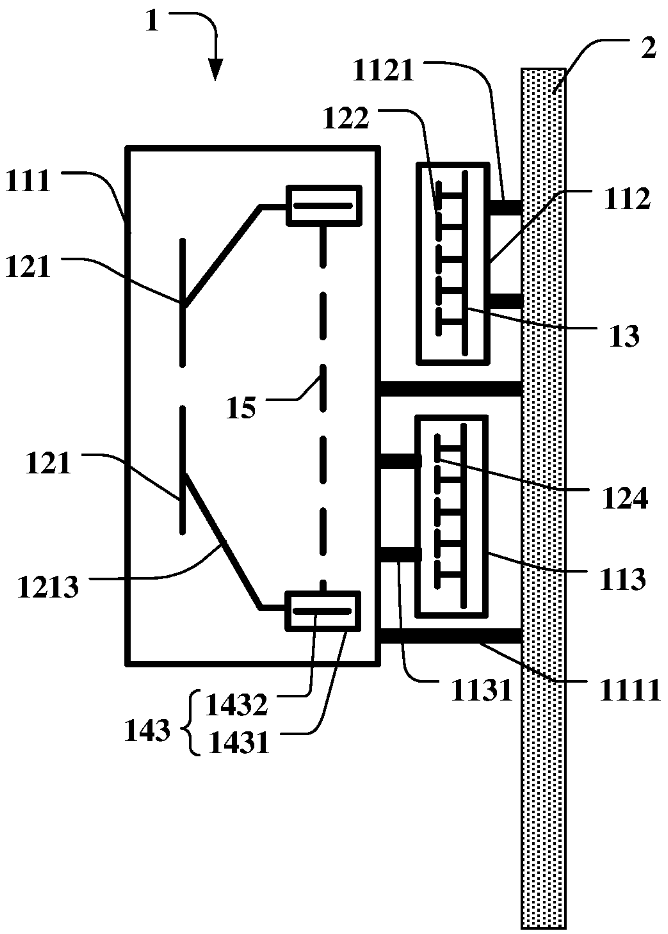
FIG. 17 is a schematic diagram of composition of an antenna system according to another possible embodiment of this disclosure.

Alternatively, FIG. 17 is a schematic diagram of an antenna system according to another possible embodiment. In the embodiment of FIG. 17, a second frequency band radiation element array 122 and a fourth frequency band radiation element array 124 may be alternatively disposed in different radomes. In a specific embodiment, the second frequency band radiation element array 122 may be disposed in a second radome 112, and the fourth frequency band radiation element array 124 may be disposed in a third radome 113. When the second radome 112 and the third radome 113 are mounted, specific mounting manners are not limited.

Still referring to FIG. 17, the second radome 112 includes a second mounting structure 1121, and the second mounting structure 1121 is mounted on a pole 2. The third radome 113 is fastened or otherwise connected to a first radome 111, the first radome 111 includes a first mounting structure 1111, and the first mounting structure 1111 is mounted on the pole 2.

Figure 18:
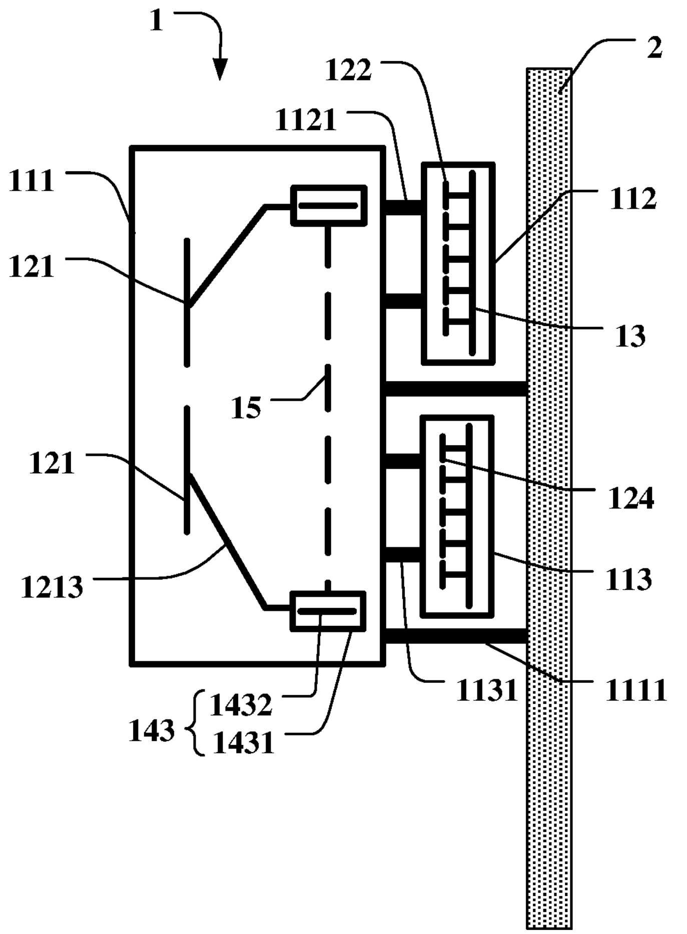
FIG. 18 is a schematic diagram of composition of an antenna system according to another possible embodiment of this disclosure.

Alternatively, FIG. 18 is a schematic diagram of an antenna system according to another possible embodiment of this disclosure. In the embodiment shown in FIG. 18, a first radome 111, a second radome 112, and a third radome 113 may be alternatively fastened or otherwise connected as an integrated structure, and then the integrated structure is mounted on a pole 2 by using a first mounting structure 1111 connected to the first radome 111.

Figure 19:
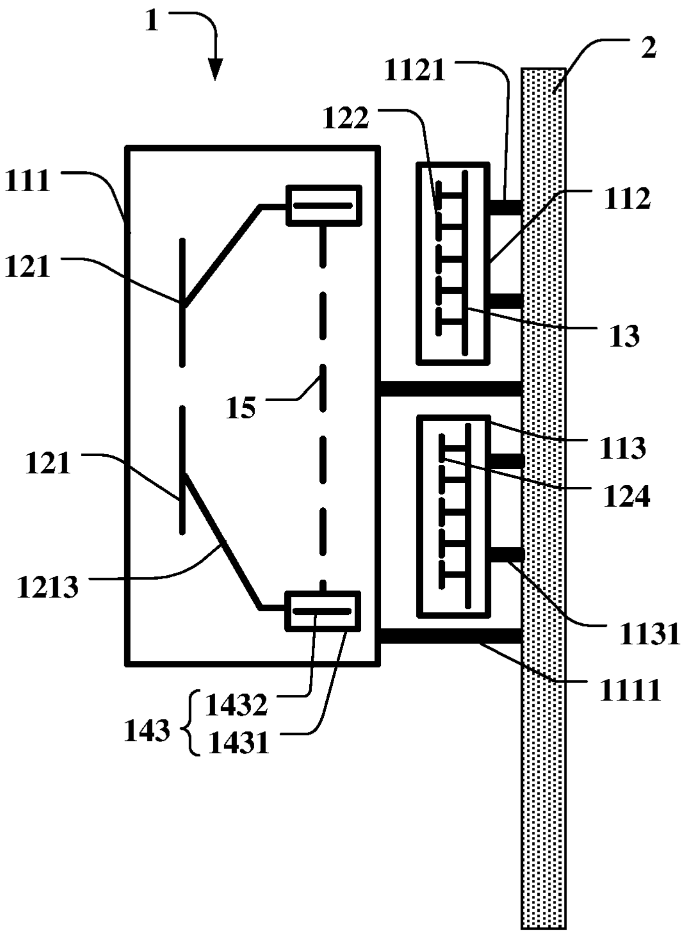
FIG. 19 is a schematic diagram of composition of an antenna system according to another possible embodiment of this disclosure.

Alternatively, FIG. 19 is a schematic diagram of an antenna system according to another possible embodiment. In the embodiment shown in FIG. 19, a first radome 111 has a first mounting structure 1111, the first mounting structure 1111 is mounted on a pole 2, a second radome 112 has a second mounting structure 1121, and the second mounting structure 1121 is mounted on the pole 2. A third radome 113 may further have a third mounting structure 1131, and the third mounting structure 1131 is mounted on the pole 2. In a specific embodiment, the first radome 111, the second radome 112, and the third radome 113 are independently mounted on the pole 2.

It is clear that a person skilled in the art may make various modifications and variations to disclosed embodiments without departing from the protection scope of this disclosure. In this way, this disclosure is intended to cover these modifications and variations thereof, as provided in the accompanying claims.

What is claimed is:

1. An antenna system, comprising: a frequency selective surface; a first frequency band radiation element array; a second frequency band radiation element array; and a phase shifter, wherein: the frequency selective surface is disposed between the first frequency band radiation element array and the second frequency band radiation element array and is configured to reflect a signal of the first frequency band radiation element array and transmit a signal of the second frequency band radiation element array, wherein: the first frequency band radiation element array is disposed in a first radome having a first mounting structure connectable to an external structure; the second frequency band radiation element array is disposed in a second radome; and the first radome is connected to the second radome, the first frequency band radiation element array and the second frequency band radiation element array being arranged in a stacked manner; and the phase shifter comprises a cavity disposed at an edge of the frequency selective surface and a phase shift circuit disposed at the cavity, the cavity being configured to form a ground layer of the phase shift circuit, and a first extension direction of the cavity is consistent with a second extension direction of the first frequency band radiation element array.

2. The antenna system according to claim 1, wherein:

the frequency selective surface comprises a first side edge and a second side edge;

the phase shifter comprises a first phase shifter and a second phase shifter;

the cavity comprises a first cavity and a second cavity, wherein the first phase shifter includes the first cavity and the second phase shifter includes the second cavity, the first cavity of the first phase shifter is disposed at the first side edge and the second cavity of the second phase shifter is disposed at the second side edge; and the first frequency band radiation element array comprises a first array and a second array, the first phase shifter being connected to the first array and the second phase shifter being connected to the second array.

3. The antenna system according to claim 1, wherein: the first frequency band radiation element array comprises: a radiation element having a first balun comprising a first outer conductor and a first inner conductor; and a first radiation arm and a second radiation arm that are co-polarized, the first outer conductor is connected to the first radiation arm and the cavity, wherein: the first inner conductor is connected to the second radiation arm and to the phase shift circuit.

4. The antenna system according to claim 3, wherein an included angle between the first balun and the frequency selective surface is an acute angle.

5. The antenna system according to claim 1, further comprising a reflection plate disposed on a side of the second frequency band radiation element array positioned away from the frequency selective surface.

6. The antenna system according to claim 1, wherein a length of the cavity in the first extension direction is greater than or equal to a length of the first frequency band radiation element array in the second extension direction.

7. The antenna system according to claim 1, wherein the first frequency band radiation element array is a passive radiation element array.

8. The antenna system according to claim 1, wherein a frequency band of the first frequency band radiation element array is less than a frequency band of the second frequency band radiation element array.

9. The antenna system according to claim 1, wherein each of the first frequency radiation element array and the second frequency radiation element array includes a radiation surface disposed parallel to the frequency selective surface.

10. The antenna system according to claim 1, wherein a projection of the first frequency band radiation element array on the frequency selective surface is located on the frequency selective surface.

11. The antenna system according to claim 1, wherein: the second radome having a second mounting structure, and the second mounting structure is connectable to the external structure.

12. The antenna system according to claim 1, further comprising:

a third frequency band radiation element array, the first frequency band radiation element array and the third frequency band radiation element array are located on a same side of the frequency selective surface.

13. The antenna system according to claim 1, further comprising: a third frequency band radiation element array, the first frequency band radiation element array and the third frequency band radiation element array being located on a same side of the frequency selective surface; and the third frequency band radiation element array is disposed in the first radome.

14. The antenna system according to claim 1, further comprising:

a fourth frequency band radiation element array, the second frequency band radiation element array and the fourth frequency band radiation element array being located on a same side of the frequency selective surface.

15. The antenna system according to claim 1, further comprising: a fourth frequency band radiation element array, the second frequency band radiation element array and the fourth frequency band radiation element array being located on a same side of the frequency selective surface, the fourth frequency band radiation element array being disposed in a third radome, the third radome being provided with a third mounting structure connectable to the external structure.

16. The antenna system according to claim 1, further comprising: a fourth frequency band radiation element array, the second frequency band radiation element array and the fourth frequency band radiation element array being located on a same side of the frequency selective surface, the fourth frequency band radiation element array being disposed in a third radome connectable to the first radome.

17. The antenna system according to claim 1, wherein:

a radiation element of the first frequency band radiation element array includes a first balun, the first balun is electrically connected to the phase shifter and the first balun is connected to the frequency selective surface.

18. A base station antenna feeder system, comprising: an antenna system comprising: a frequency selective surface; a first frequency band radiation element array; a second frequency band radiation element array; and a phase shifter, wherein: the frequency selective surface is disposed between the first frequency band radiation element array and the second frequency band radiation element array and is configured to reflect a signal of the first frequency band radiation element array and to transmit a signal of the second frequency band radiation element array, wherein: the first frequency band radiation element array is disposed in a first radome having a first mounting structure connectable to an external structure; the second frequency band radiation element array is disposed in a second radome; and the first radome is connected to the second radome, the first frequency band radiation element array and the second frequency band radiation element array being arranged in a stacked manner; and the phase shifter comprises a cavity disposed at an edge of the frequency selective surface and a phase shift circuit disposed at the cavity, a first extension direction of the cavity being consistent with a second extension direction of the first frequency band radiation element array.

19. The base station antenna feeder system according to claim 18, wherein:

the frequency selective surface comprises a first side edge and a second side edge; and the phase shifter comprises a first phase shifter and a second phase shifter;

the cavity comprises a first cavity and a second cavity, wherein the first phase shifter includes the first cavity and the second phase shifter includes the second cavity, the first cavity of the first phase shifter is disposed at the first side edge and the second cavity of the second phase shifter is disposed at the second side edge; and the first frequency band radiation element array comprises a first array and a second array, the first phase shifter being connected to the first array and the second phase shifter being connected to the second array.

20. The base station antenna feeder system according to claim 18, wherein: a radiation element of the first frequency band radiation element array comprises a first balun having a first outer conductor and a first inner conductor; and the radiation element of the first frequency band radiation element array comprises a first radiation arm and a second radiation arm that are co-polarized, wherein the first outer conductor is connected to the first radiation arm and to the cavity, and the first inner conductor is connected to the second radiation arm and to the phase shift circuit.

21. The base station antenna feeder system according to claim 18, wherein:

a radiation element of the first frequency band radiation element array includes a first balun, the first balun is electrically connected to the phase shifter, and the first balun is connected to the frequency selective surface.

* * * * *